(12) United States Patent
Ju et al.

(10) Patent No.: US 12,386,536 B2
(45) Date of Patent: Aug. 12, 2025

(54) DATA PROCESSING METHOD AND APPARATUS FOR SHARED MEMORY, AND DEVICE AND MEDIUM

(71) Applicant: BEIJING CHJ INFORMATION TECHNOLOGY CO., LTD., Beijing (CN)

(72) Inventors: Jiaqi Ju, Beijing (CN); Liucheng Tang, Beijing (CN)

(73) Assignee: Beijing CHJ Information Technology Co., LTD., Beijing (CN)

( * ) Notice: Subject to any disclaimer, the term of this patent is extended or adjusted under 35 U.S.C. 154(b) by 0 days.

(21) Appl. No.: 18/566,200

(22) PCT Filed: Apr. 24, 2022

(86) PCT No.: PCT/CN2022/088856
§ 371 (c)(1),
(2) Date: Dec. 1, 2023

(87) PCT Pub. No.: WO2022/267676
PCT Pub. Date: Dec. 29, 2022

(65) Prior Publication Data
US 2024/0256163 A1 Aug. 1, 2024

(30) Foreign Application Priority Data
Jun. 23, 2021 (CN) .......................... 202110699208.7

(51) Int. Cl.
*G06F 3/06* (2006.01)

(52) U.S. Cl.
CPC ............ *G06F 3/064* (2013.01); *G06F 3/0604* (2013.01); *G06F 3/0659* (2013.01); *G06F 3/0673* (2013.01)

(58) Field of Classification Search
None
See application file for complete search history.

(56) References Cited

U.S. PATENT DOCUMENTS 5,548,728 A 8/1996 Danknick
8,838,911 B1 9/2014 Hubin
(Continued)

FOREIGN PATENT DOCUMENTS

CN 103559166 A 2/2014
CN 106168916 A 11/2016
(Continued)

OTHER PUBLICATIONS

International Search Report corresponding to PCT Application No. PCT/CN2022/088856, mailed Jun. 29, 2022 (Chinese and English language document) (5 pages).
(Continued)

*Primary Examiner* — Brian R Peugh

(57) ABSTRACT

A data processing method for a shared memory includes: receiving a writing operation request of target data, the writing operation request being configured to request to write the target data to the shared memory; obtaining a writing index value in the shared memory, and updating the writing index value, an updated writing index value being 1 greater than the writing index value obtained before the updating, and the writing index value being configured to lock a storage block to which data is to be written; determining a storage block corresponding to the updated writing index value as a target storage block; and writing the target data to the target storage block.

15 Claims, 6 Drawing Sheets

(56) References Cited

U.S. PATENT DOCUMENTS

| | | | |
|---|---|---|---|
| 2009/0083393 A1 | 3/2009 | Mizukami | |
| 2013/0246672 A1* | 9/2013 | Saputra | G06F 9/544 710/56 |
| 2017/0344473 A1* | 11/2017 | Gidra | G06F 12/0269 |
| 2020/0210255 A1 | 7/2020 | Shen et al. | |
| 2020/0301765 A1 | 9/2020 | Vary | |

FOREIGN PATENT DOCUMENTS

| | | |
|---|---|---|
| CN | 107632945 A | 1/2018 |
| CN | 110287044 A | 9/2019 |
| CN | 114327946 A | 4/2022 |
| EP | 1936501 A1 | 6/2008 |

OTHER PUBLICATIONS

European Search Report for corresponding EP application 22827175.5, mailed Jul. 10, 2024 (10 pages).

Office Action for corresponding CN application No. 2021106992087, mailed Dec. 27, 2024 (24 pages) English and Chinese language translations.

\* cited by examiner

DATA PROCESSING METHOD AND APPARATUS FOR SHARED MEMORY, AND DEVICE AND MEDIUM

CROSS-REFERENCE TO RELATED APPLICATION

This disclosure is a U.S. national phase of International Application No. PCT/CN2022/088856, filed on Apr. 24, 2022, which is based on and claims the priority to Chinese Patent Application No. 202110699208.7, filed on Jun. 23, 2021, the entire content of which is incorporated herein by reference.

TECHNICAL FIELD

The disclosure relates to a field of computer technologies, and particularly to a data processing method and a data processing apparatus for a shared memory, a device, and a medium.

BACKGROUND

A vehicle control system splits different functional services (such as a background control service and a log recording service) of an application based on a service-oriented architecture (SOA), and communication between the services is performed via interfaces and protocols. Therefore, a set of reliable and efficient communication mechanisms is needed between the services, to meet a requirement of data distribution.

A data distribution service (DDS) may be configured to distribute data, that is, a data publisher may write a message to into a subject in a shared memory, and all data subscribers who subscribe to the subject may read the message from the shared memory. During a data written process in the related, the data publisher needs to lock the shared memory for performing a data writing operation. After all data has been written, a following data publisher may continue to write data into the shared memory.

Thus, it is difficult for multiple data publishers to write data to the shared memory simultaneously.

SUMMARY

A first aspect of embodiments of the disclosure provides a data processing method for a shared memory, including:
receiving a writing operation request of target data, the writing operation request being configured to request to write the target data to the shared memory;
obtaining a writing index value in the shared memory, and updating the writing index value, an updated writing index value being 1 greater than the writing index value obtained before the updating, and the writing index value being configured to lock a storage block to which data is to be written;
determining a storage block corresponding to the updated writing index value as a target storage block; and
writing the target data to the target storage block.

A second aspect of embodiments of the disclosure provides an electronic device, including:
one or more processors; and
a storage device, configured to store one or more programs,
The one or more processors are caused to implement the data processing method for a shared memory according to any of embodiments of the disclosure when the one or more programs are executed by the one or more processors.

A third aspect of embodiments of the disclosure provides a computer readable storage medium having a computer program stored thereon. When the computer program is executed by a processor, the data processing method for a shared memory according to any of embodiments of the disclosure is performed.

BRIEF DESCRIPTION OF THE DRAWINGS

The accompanying drawings, which are incorporated in and constitute a part of the description, illustrate embodiments consistent with the disclosure and serve to explain the principle of the disclosure together with the description.

In order to explain the technical solution in embodiments of the disclosure or in the related art more clearly, a brief introduction is made below to the accompanying drawings required in the description of the embodiment or in the related art. Apparently, for the skilled in the art, other accompanying drawings may be obtained based on these accompanying drawings without paying creative labor.

DETAILED DESCRIPTION

In order to understand the above objectives, features and advantages of the disclosure more clearly, further description is made below to the technical solution of the disclosure. It should be noted that, embodiments of the disclosure and features in the embodiments may be combined with each other without conflict.

Multiple specific details are set forth in the following description in order to fully understand the disclosure, but the disclosure may be implemented in other ways than those described herein. Apparently, embodiments in the description are merely a part of the embodiments of the disclosure, but not all of them.

In a vehicle control system, different functional services (such as a background control service and a logging service) of an application may be split, and communication between the services is performed via interfaces and protocols. Information required in the communication is stored in a shared memory. A data publisher may write a message to the shared memory, and a data subscriber may read a message from the shared memory.

In the related art, the data publisher may lock the shared memory when writing the message to the shared memory, and unlock the shared memory until the writing operation is completed. During the locking period, no other data publisher is able to perform a writing operation, and the data subscriber is unable to perform data reading.

According to an embodiment of the disclosure, only a storage block to which data is written is locked when the data is written to the shared memory, and other storage blocks are in an unlocked state, such that other data publishers are able to perform the writing operation, and the data subscriber is able to effectively read data simultaneously. A problem that it is difficult to implement simultaneous writings and simultaneous reading and writing in the related art is solved.

Figure 1:
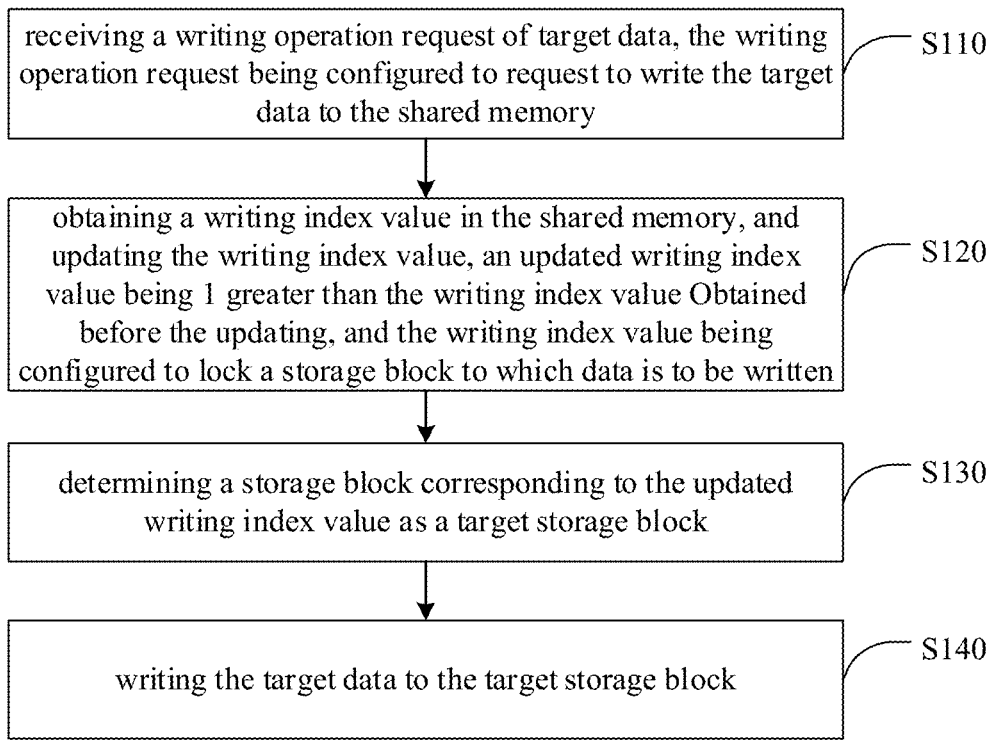
FIG. 1 is a flow chart illustrating a data processing method for a shared memory according to an embodiment of the disclosure.

FIG. 1 is a flow chart illustrating a data processing method for a shared memory according to embodiments of the disclosure. Embodiments of the disclosure may be applied to a situation where multiple data publishers write data to a shared memory simultaneously. The method according to the embodiment of the disclosure may be executed by a data processing apparatus for a shared memory. The apparatus may be implemented in hardware and/or software and configured in an electronic device. The data processing method for the shared memory according to any embodiment of the disclosure may be implemented by the apparatus. As illustrated in FIG. 1, the method includes following steps S110 to S140.

S110, a writing operation request of target data is received. The writing operation request is configured to request to write the target data to the shared memory.

In embodiments of the disclosure, the writing operation request of the target data is a request sent to the shared memory when the data publisher intends to write data to the shared memory. The electronic device may write the target data carried in the writing operation request to a storage block in the shared memory when receiving the writing operation request of the target data.

The shared memory may include multiple subjects, and multiple storage blocks may be written under each subject. The writing operation request of the target data may include an identification of a subject to which the target data is to be written, such that the electronic device may directly locate a storage block of the target data in the shared memory.

S120, a writing index value in the shared memory is obtained, and the writing index value is updated. An updated writing index value is 1 greater than the writing index value obtained before the updating, and the writing index value is configured to lock a storage block to which data is to be written.

In embodiments of the disclosure, the writing index value records an identification of a storage block in the shared memory where data is recently written, to indicate an operation of writing data of the data publisher, such that the data publisher may accurately know a position of a storage block in the shared memory where data is currently written based on the writing index value.

In a detailed implementation, the identification of the storage block may be implemented by a numeral, a letter, or a combination thereof. Thus, the electronic device may uniformly manage the multiple storage blocks in the shared memory.

The electronic device may update the writing index value recorded in the shared memory after receiving the writing operation request of the target data. In embodiments of the disclosure, the electronic device may assign a storage block in the shared memory based on the writing index value for the data publisher to write the target data after receiving the writing operation request.

It should be noted that the writing index value in the shared memory may be updated and superimposed in an ascending sequence, thus ensuring that each storage block in the shared memory may be utilized effectively.

S130, a storage block corresponding to the updated writing index value is determined as a target storage block.

In embodiments of the disclosure, the shared memory includes multiple storage blocks, and all the storage blocks in the shared memory may be traversed in turn based on the writing index value.

The identifications of the storage blocks in the shared memory may be arranged in sequence according to a preset rule, and the writing index value is an identification of one of the storage blocks, such that the storage block may be accurately located when the writing index value is updated.

In embodiments of the disclosure, a detailed implementation of the preset rule may be implemented based on an ascending order of numerals.

In some embodiments, the shared memory includes 10 storage blocks, and the first storage block to the tenth storage block are identified in sequence by the numerals 1-10. When the writing index value is updated to 4, the fourth storage block may be directly located as the target storage block where the target data is to be stored.

S140, the target data is written to the target storage block.

In embodiments of the disclosure, the electronic device writes the received target data sent by the data publisher to the target storage block. The electronic device may write the target data to the target storage block in a way, such as copying.

In embodiments of the disclosure, the writing index value may support an operation of writing multiple pieces of data to different storage blocks in the shared memory simultaneously, such that multiple data publishers are able to perform data writing operations in the shared memory simultaneously, and efficiency of writing data to the shared memory may be effectively improved. Meanwhile, it may avoid data inconsistency caused by an uncertainty of an execution order and an unpredictability of interruption of multiple threads when writing data to one storage block simultaneously.

After assigning a storage block for a first writing operation request (such as the writing operation request of the target data), the electronic device receives a second writing operation request (such as a writing operation request of another piece of data), and the target data is being written. At this time, the electronic device may update the writing index value again and sequentially assign a following storage block for the second writing operation request, such that the multiple pieces of data may be written to the shared memory simultaneously.

In some embodiments, a writing index value corresponding to the first writing operation is 4, thus the storage block where the target data is to be stored is a storage block corresponding to 4. The electronic device receives the second writing operation request during a process of writing the target data to the storage block corresponding to the writing index value 4, thus the electronic device updates the writing index value to 5, and writes data corresponding to the second writing operation request in a storage block corresponding to the writing index value 5 at the same time writing the target data to the storage block corresponding to the writing index value 4.

In embodiments of the disclosure, writing the target data to the target storage block includes:

determining that the target storage block is a first storage block in the shared memory and that data is stored in the first storage block; and storing the target data to the first storage block by replacing the data with the target data.

In embodiments of the disclosure, in case that all the storage blocks included in the shared memory are being written with data, the electronic device may overwrite the data in the first storage block in the shared memory with the target data when receiving the writing operation request of the target data, such that the target data may be effectively written to the shared memory.

In to embodiments of the disclosure, a position of the storage block to which the data is written in the shared memory may be effectively recorded in real time by employing the writing index value. The shared memory does not need to be locked during a process of the data publisher writing the data, such that the multiple data publishers are able to perform data writing simultaneously based on the writing index value, thereby effectively implementing simultaneous writing of the multiple pieces of data in the shared memory.

Figure 2:
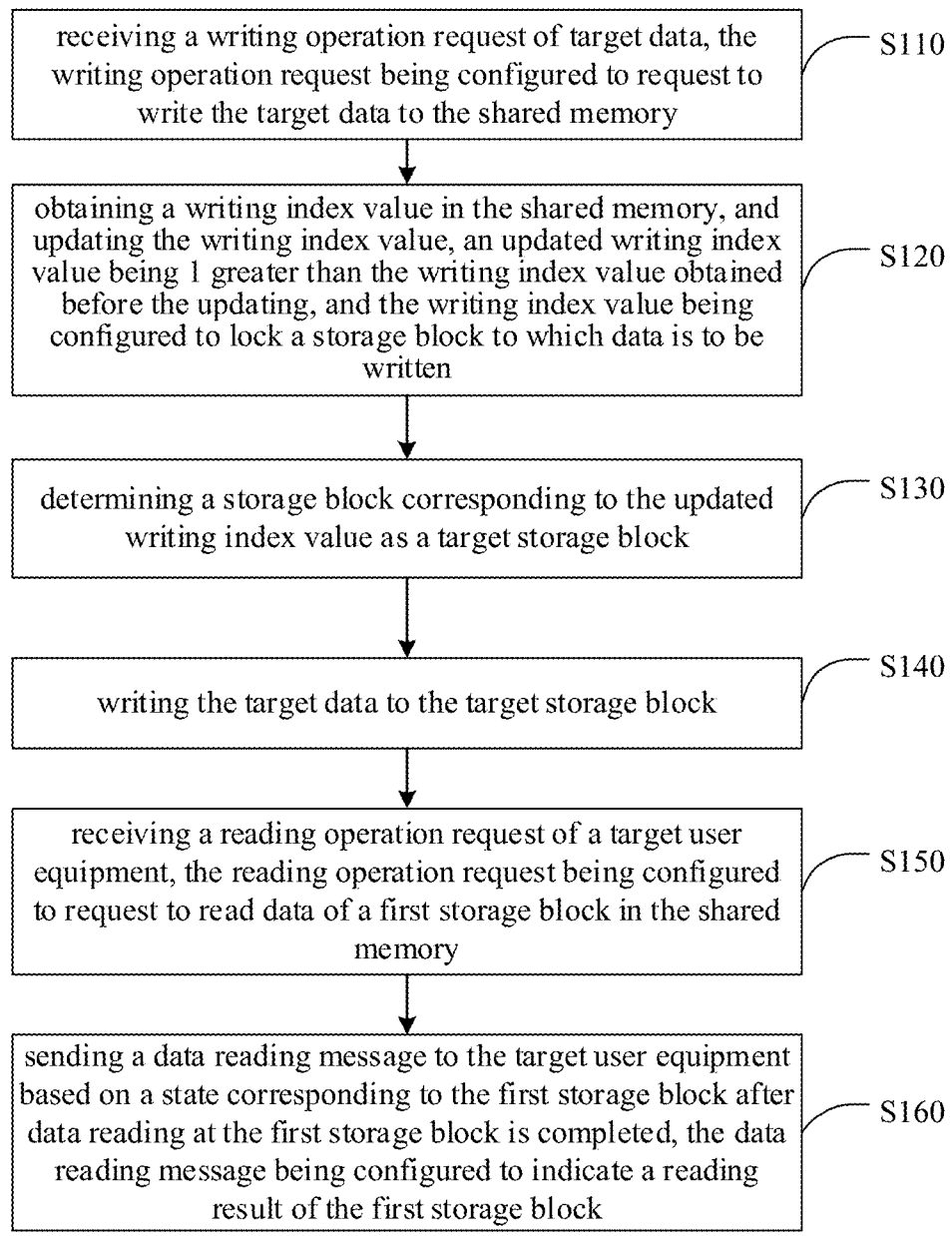
FIG. 2 is a flow chart illustrating a data processing method for a shared memory according to another embodiment of the disclosure.

FIG. 2 is a flow chart illustrating a data processing method for a shared memory according to another embodiment of the disclosure. This embodiment is on basis of the above embodiment. Further, after the step S140, the method according to the embodiment of the disclosure may also include the following.

S150, a reading operation request of a target user equipment is received. The reading operation request is configured to request to read data of a first storage block in the shared memory.

In embodiments of the disclosure, the target user equipment is one of user equipment used by multiple data subscribers subscribing the data in the shared memory. The reading operation request of the target user equipment is a request sent to the shared memory by the target user equipment when a data subscriber intends to read the data from the shared memory. The electronic device may read data to be read from a corresponding storage block based on an identification of the data to be read carried in the reading operation request when receiving the reading operation request sent by the target user equipment.

The shared memory may include multiple subjects, and multiple storage blocks may be written under each subject. The reading operation request of the target user equipment may also include an identification of a subject of the data to be read, such that the electronic device may directly query the data to be read from the multiple storage blocks in the shared memory.

It should be noted that, the target user equipment may actively send the reading operation request to the electronic device. The reading operation request sent by the target user equipment may be sent based on a data reading time point preset by the target user equipment, or the target user equipment may send the reading operation request to the electronic device according to a received data reading message sent by the electronic device, such that the target user equipment may obtain updated new data in the shared memory in time.

The first storage block may be determined by the target user equipment based on a storage block read from the shared memory.

In embodiments of the disclosure, before determining that a state corresponding to the first storage block is the first state, the method in embodiments of the disclosure includes:

obtaining a reading index value corresponding to the target user equipment, in which the reading index value is configured to indicate a storage block in the shared memory where the target user equipment completes data reading; and determining that a storage index value is greater than the reading index value.

In embodiments of the disclosure, the reading index value is an identification of a storage block from which data is read from the shared memory last time recorded by the target user equipment. The identification of the storage block is, such as, a numeral, or a letter, or a combination thereof.

In case that the electronic device determines that the storage index value is greater than the reading index value, it represents that new data is written to the shared memory. In this case, the new data may be returned to the target user equipment, such that the target user may effectively obtain the data to be read.

In case that the electronic device determines that the storage index value is equal to the reading index value, it represents that there is no new data written to the shared memory. In this case, the electronic device may return response information of the reading operation request to the target user equipment. The response information of the reading operation request includes a message indication that there is no new data written. Therefore, it may be avoided that resource consumption is increased because the electronic device repeatedly reads the data from the shared memory.

S160, a data reading message is sent to the target user equipment based on the state corresponding to the first storage block after data reading at the first storage block is completed. The data reading message is configured to indicate a reading result of the first storage block.

In embodiments of the disclosure, a data writing operation may appear during data reading at any storage block in the shared memory. In order to enable the data reading successful, the state corresponding to the first storage block may be checked again after the data reading is completed, thereby preventing generation of invalid data.

Figure 3:
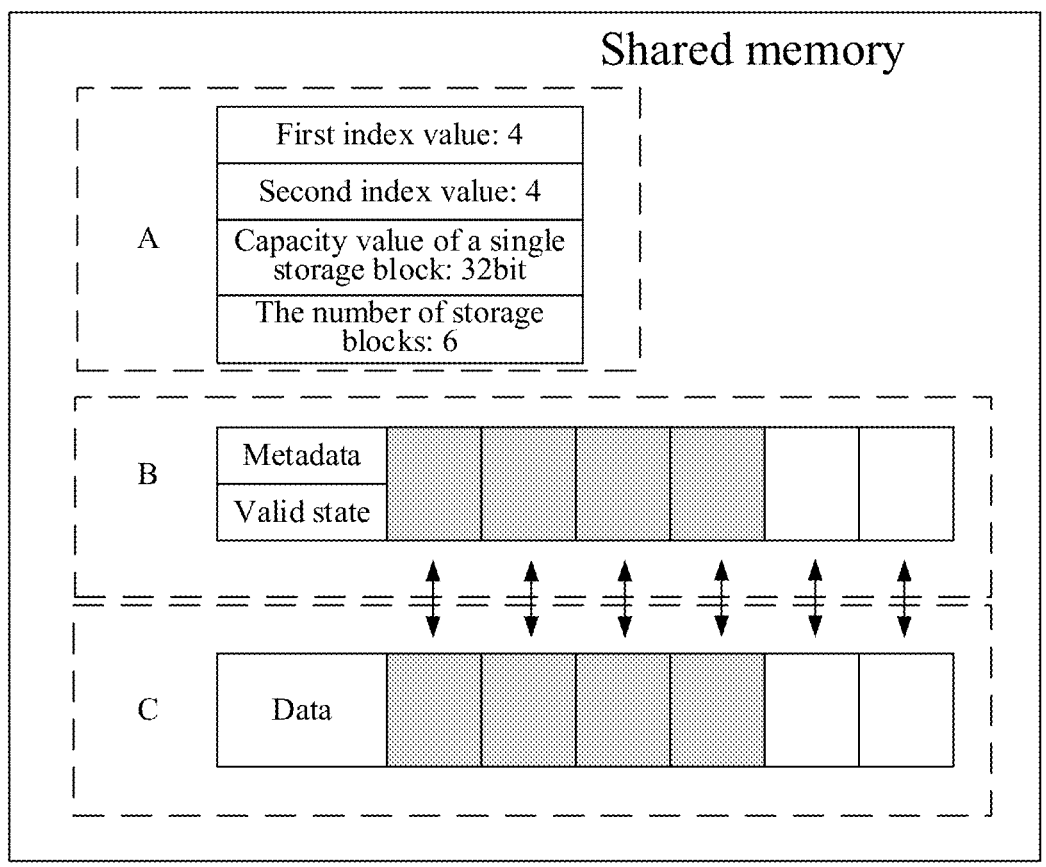
FIG. 3 is a schematic diagram illustrating data writing and data reading according to an embodiment of the disclosure.

Embodiments of the disclosure provide a schematic diagram illustrating the data writing and the data reading, and see FIG. 3 for details.

The shared memory may be divided into three storage spaces, and each storage space stores different pieces of information. For example, a storage space (C) includes multiple storage blocks, some or all of which are written with data, a storage space (B) stores a state of each storage block correspondingly, and a storage space (A) stores a writing index value, a storage index value, a total number (count) of all the storage blocks included in the storage space C and a storage capacity (size) of each storage block in the storage space C.

It should be noted that, the storage capacity of each storage block may be the same or different.

A process of the data writing may be as following.

After writing the data to a storage block is completed and there is no other data writing operation, the writing index value is the same as the storage index value. Then an obtained writing index value (lock_index) is 4, and the writing index value is stored in an intermediate variable (l_lock_index). The writing index value is added by 1 atomically based on an operation of compare and swap (CAS). As illustrated in FIG. 3, the writing index value is 5. A state corresponding to l_lock_index is marked as INVALID atomically. The target data (message) is copied into the fifth storage block in the storage space C corresponding to l_lock_index. A state of meta corresponding to l_lock_index is marked as VALID atomically. The storage index value (write_index) is added by 1 atomically. In this case, write_index=5. A thread for waiting for Futex is woken up by employing the Futex, such that the data subscriber may obtain data in time.

A process of the data reading may be as following.

The data subscriber calls futex_wait to fall asleep. The electronic device compares the storage index value (write_index) with the reading index value (read_index) when the data subscriber is woken up upon receiving a waking-up operation (which may be sent by the electronic device). The data reading may be performed in case that the write_index is greater than the read_index. The data reading is performed in case that the state of the first storage block is determined to be valid. After the data reading is completed, if the state of the first storage block is determined to be valid again, the read data is sent to the data subscriber. The read data is discarded in case that the state of the first storage block is determined to be invalid again.

In embodiments of the disclosure, data update notification can be completed by employing a lower-level futex system call, which not only solves a problem of deadlock in communication between processes, but also improves the efficiency of data processing.

Figure 4:
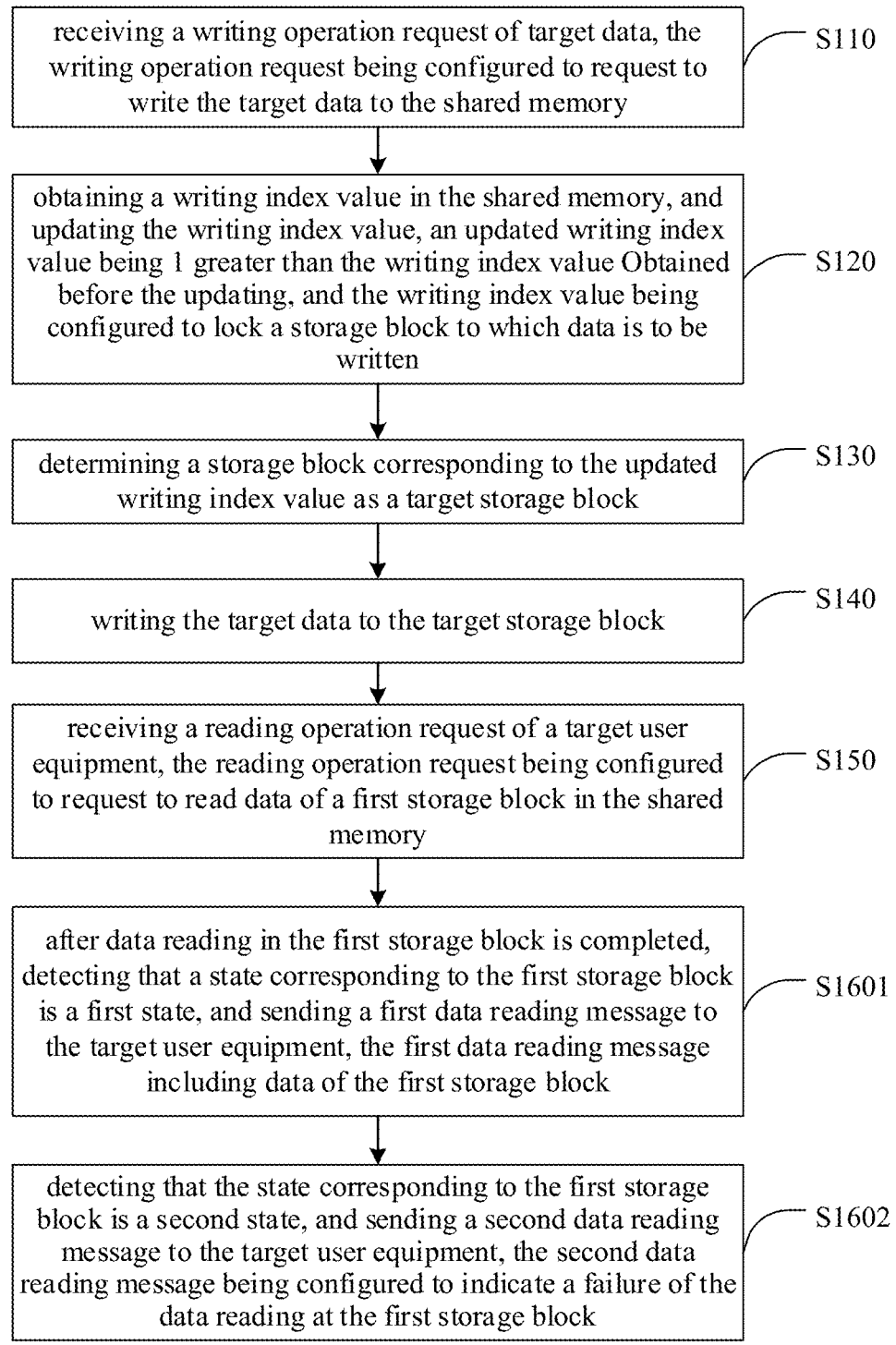
FIG. 4 is a flow chart illustrating a data processing method for a shared memory according to another embodiment of the disclosure.

FIG. 4 is a flow chart illustrating a data processing method for a shared memory according to another embodiment of the disclosure. This embodiment is on basis of the above embodiments. A possible implementation of step S160 includes the following.

S1601, it is detected that the state corresponding to the first storage block is the first state after data reading at the first storage block is completed, and a first data reading message is sent to the target user equipment. The first data reading message includes the data in the first storage block.

In embodiments of the disclosure, the state corresponding to the first storage block may represent the state of the data stored in the first storage block, that is, valid or invalid, or being written or written completed. The first state may be the valid state. When the electronic device determines that the state corresponding to the first storage block is valid, it represents that the data has been successfully written to the first storage block, and no data publisher performs a data writing operation at this time.

In embodiments of the disclosure, simultaneous data reading and data writing operations are supported. Therefore, there may be a condition where a data publisher writes data to the first storage block when the electronic device reads data from the first storage block. In this case, the data read from the first storage block is invalid, that is, the data originally stored at the first storage block is disturbed by the writing operation.

Therefore, the electronic device may determine again whether the state corresponding to the first storage block is still valid after completing data reading at the first storage block. If yes, it means that no data publisher writes data to the first storage block during the process that the electronic device reads the data from the first storage block. In this case, the read data is valid and available. Therefore, the data sent by the electronic device to the target user equipment may be effectively guaranteed to be accurate.

In embodiments of the disclosure, after sending the first data reading message to the target user equipment, the method in embodiments of the disclosure includes:

sending an update message of the reading index value to the target user equipment. The update message is configured to indicate the target user equipment to update the reading index value, and an updated reading index value is 1 greater than the reading index value obtained before the updating.

In embodiments of the disclosure, the electronic device may remind the target user equipment to update the reading index value stored locally after sending the data read from the first storage block to the target user equipment, such that the target user equipment may provide an accurate reading index value when obtaining a message from the shared memory next time, and the validity of the obtained data is guaranteed.

S1602, it is detected that the state corresponding to the first storage block is a second state, and a second data reading message is set to the target user equipment. The second data reading message is configured to indicate a failure of the data reading at the first storage block.

The second state is configured to indicate that data is being written to the first storage block.

In embodiments of the disclosure, the state corresponding to the first storage block may represent the state of the data stored in the first storage block, that is, valid or invalid. The second state may be the invalid state. When the electronic device determines that the state corresponding to the first storage block is invalid, it represents that data is being written to the first storage block, that is, one or more data publishers are writing data to the first storage block.

In this case, the electronic device may discard the data read from the first storage block and send the message indicating the failure of the data reading to the target user equipment, such that the target user equipment may know an operation state at the first storage block in time. Thus, a problem of low accuracy of the data obtained by the target user equipment due to sending abnormal data to the target user equipment by the electronic device may be effectively avoided.

It should be noted that the steps S1601 and S1602 in embodiments of the disclosure are two detection results of the state corresponding to the first storage block, that is, the state corresponding to the first storage block may be valid, or the state corresponding to the first storage block may be invalid.

In embodiments of the disclosure, before writing the target data to the target storage block, the method in embodiments of the disclosure includes:

setting a state corresponding to the target storage block to the second state.

After writing the target data to the target storage block, the method in embodiments of the disclosure includes:

setting the state corresponding to the target storage block to the first state.

In embodiments of the disclosure, the electronic device may lock the target storage block before writing the target data to the target storage block in the shared memory, to avoid a poor data consistency at the target storage block caused by other data being written simultaneously.

After the electronic device writes the target data to the target storage block of the shared memory, it represents that writing the data to the target storage block is completed, and the target storage block is to be unlocked, such that a writing operation may be effectively performed when other data is written to the target storage block. Thus, the timeliness of data at the target storage block is guaranteed.

In embodiments of the disclosure, after setting the state corresponding to the target storage block to the first state, the method in embodiments of the disclosure includes:

updating a storage index value in the shared memory. An updated storage index value is 1 greater than the storage index value obtained before the updating, and the storage index value is configured to indicate a storage block where data writing is completed in the shared memory.

In embodiments of the disclosure, after the electronic device sets the state corresponding to the target storage block to be valid, it represents that the data writing operation is completed at the target storage block. That is, the data has been successfully stored in the target storage block. The storage index value of the shared memory is updated, such that the storage block with the written data in the shared memory may be effectively identified, thereby facilitating other users to accurately identify the updated data when obtaining data from the shared memory.

Figure 5:
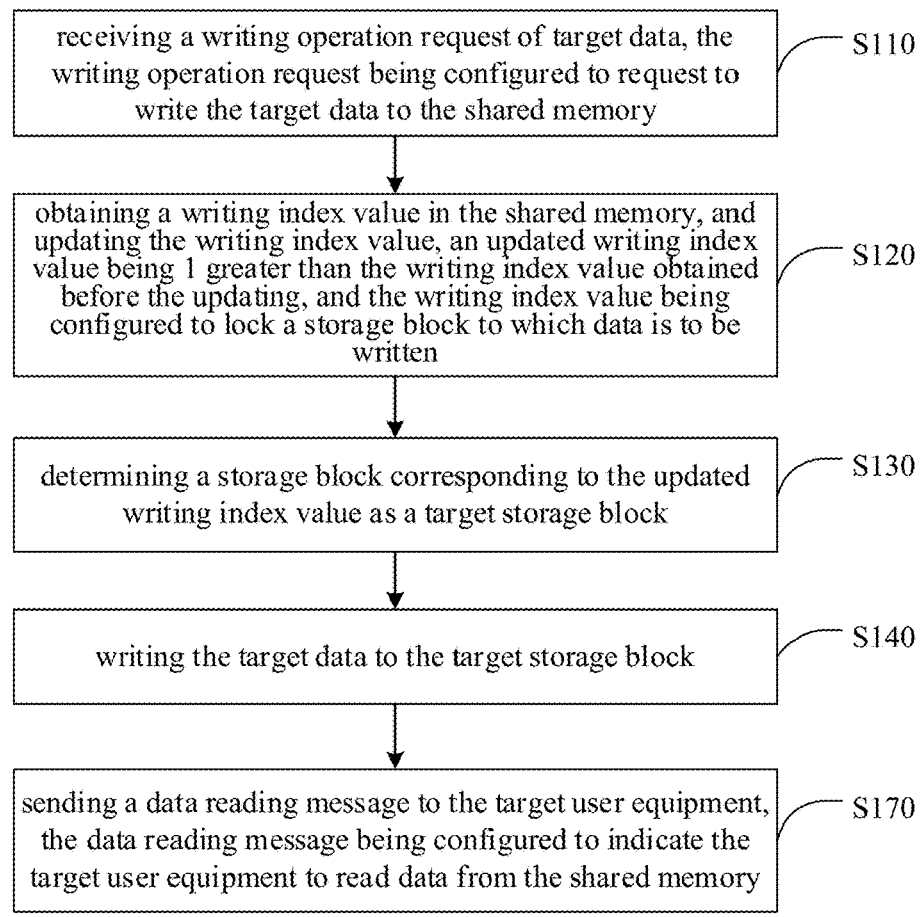
FIG. 5 is a flow chart illustrating a data processing method for a shared memory according to another embodiment of the disclosure.

FIG. 5 is a flow chart illustrating a data processing method for a shared memory according to another embodiment of the disclosure. This embodiment is on the basis of the above embodiments. Further, after the step S140, the method in this embodiment includes:

S170, sending a data reading message to a target user equipment, the data reading message being configured to indicate the target user equipment to read data from the shared memory.

In embodiments of the disclosure, the electronic device may remind the data subscriber of the target storage block to obtain target data in time when writing the target data to the target storage block, such that the data subscriber may obtain new data in time after the shared memory is updated.

In addition, the data reading message may include a subject corresponding to the target data, such that the target user equipment may clearly know about the subject that the obtained data belongs to, thereby facilitating a reasonable utilization of the obtained data by the target user.

Figure 6:
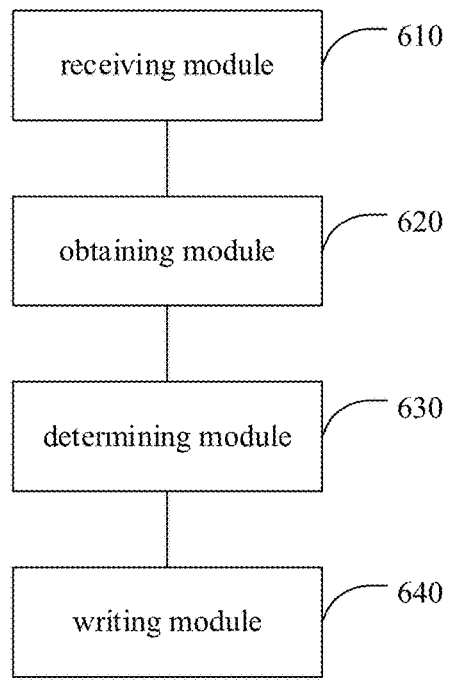
FIG. 6 is a block diagram illustrating a data processing apparatus for a shared memory according to an embodiment of the disclosure.

FIG. 6 is a block diagram illustrating a data processing apparatus for a shared memory according to embodiments of the disclosure. The apparatus is configured in an electronic device, and may implement the data processing apparatus for a shared memory according to any of embodiments of the disclosure. The apparatus includes:

a receiving module 610, configured to receive a writing operation request of target data, the writing operation request being configured to request to write the target data to the shared memory;

an obtaining module 620, configured to obtain a writing index value in the shared memory, and update the writing index value, an updated writing index value being 1 greater than the writing index value obtained before the updating, and the writing index value being configured to lock a storage block to which data is to be written;

a determining module 630, configured to determine a storage block corresponding to the updated writing index value as a target storage block; and a writing module 640, configured to write the target data to the target storage block.

In some embodiments, the apparatus in embodiments of the disclosure further includes a reading module and a sending module.

The receiving module 610 is further configured to receive a reading operation request of a target user equipment, the reading operation request being configured to request to read data of a first storage block in the shared memory.

The reading module is configured to detect that a state corresponding to the first storage block is a first state, and read the data in the first storage block. The first state is configured to indicate that data writing at the first storage block is completed.

The sending module is configured to send a data reading message to the target user equipment based on the state corresponding to the first storage block after data reading at the first storage block is completed. The data reading message is configured to indicate a reading result of the first storage block.

In embodiments of the disclosure, the sending module is configured to:

detect that the state corresponding to the first storage block is the first state, and send a first data reading message to the target user equipment, the first data reading message including the data in the first storage block; or detect that the state corresponding to the first storage block is a second state, and send a second data reading message to the target user equipment, the second data reading message being configured to indicate a failure of the data reading at the first storage block.

The second state is configured to indicate that data is being written to the first storage block.

In embodiments of the disclosure, the apparatus in embodiments of the disclosure further includes: a setting module.

The setting module is configured to set a state corresponding to the target storage block to the second state.

The setting module is further configured to set the state corresponding to the target storage block to the first state.

In embodiments of the disclosure, the apparatus in embodiments of the disclosure further includes an updating module.

The updating module is configured to update a storage index value in the shared memory, an updated storage index value being 1 greater than the storage index value obtained before the updating, and the storage index value being configured to indicate a storage block where data writing is completed in the shared memory.

In embodiments of the disclosure, the obtaining module 620 is further configured to obtain a reading index value corresponding to the target user equipment. The reading index value is configured to indicate a storage block in the shared memory where the target user equipment completes data reading.

The determining module 630 is further configured to determine that the storage index value is greater than the reading index value.

In embodiments of the disclosure, the sending module is further configured to send an update message of the reading index value to the target user equipment, the update message being configured to indicate the target user equipment to update the reading index value, and an updated reading index value being 1 greater than the reading index value obtained before the updating.

In embodiments of the disclosure, the sending module is further configured to send a data reading message to the target user equipment, the data reading message being configured to indicate the target user equipment to read data from the shared memory.

In embodiments of the disclosure, the writing module is configured to:

determine that the target storage block is a first storage block in the shared memory and that data is stored in the first storage block; and storing the target data to the first storage block by replacing the data with the target data.

With the data processing apparatus for a shared memory in embodiments of the disclosure, a storage position of the storage block to which the data is written in the shared memory is recorded in real time using the index value, and the shared memory is not necessary to be locked during a data writing process of a data publisher, such that multiple data publishers are able to write data simultaneously based on the index value, thereby effectively implementing simultaneous writing of multiple pieces of data in the shared memory.

The data processing apparatus for a shared memory according to embodiments of the disclosure may execute the data processing method for a shared memory according to any of embodiments of the disclosure, and has corresponding functional modules and beneficial effects for implementing the method.

Embodiments of the disclosure provide an electronic device. The electronic device includes one or more processors and a storage device. The storage device is configured to store one or more programs. The one or more processors are caused to implement the data processing method for a shared memory according to any of the above embodiments when the one or more programs are executed by the one or more processors.

Figure 7:
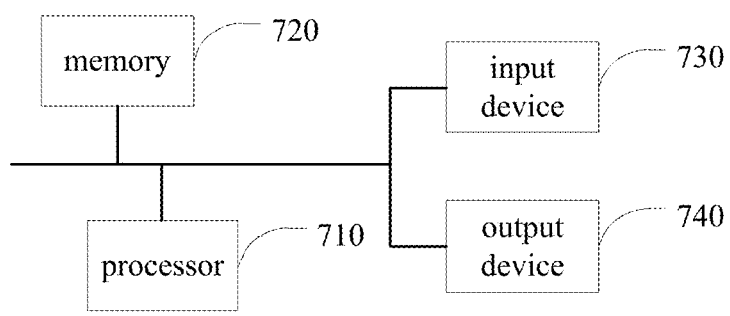
FIG. 7 is a block diagram illustrating an electronic device according to an embodiment of the disclosure.

FIG. 7 is a block diagram illustrating an electronic device according to embodiments of the disclosure. As illustrated in FIG. 7, the electronic device includes a processor 710, a memory 720, an input device 730 and an output device 740. There may be one or more processors 710 in the electronic device, and FIG. 7 takes one processor 710 as an example. The processor 710, the memory 720, the input device 730 and the output device 740 in the electronic device may be connected via a bus or in other means, and FIG. 7 takes the connection via the bus as an example.

As a computer readable storage medium, the memory 720 may be configured to store software programs, computer executable programs and modules, such as program instructions/modules corresponding to the data processing method for a shared memory according to embodiments of the disclosure. The processor 710 executes various functional applications and data processing of the electronic device by operating the software programs, instructions and modules stored in the memory 720, that is, implements the data processing method for a shared memory according to embodiments of the disclosure.

The memory 720 may include a program storage region and a data storage region. The program storage region may store an application required by an operating system or at least one function. The data storage region may store data created based on usage of a terminal. In addition, the memory 720 may include a high-speed random-access memory, and may further include a non-transitory memory, such as at least one disk memory device, a flash memory device, or other non-transitory solid-state memory device. In some embodiments, the memory 720 may further include memories remotely located to the processor 710, and these remote memories may be connected to the electronic device via a network. Examples of the above network include, but are not limited to, an Internet, an intranet, a local area network, a mobile communication network or combinations thereof.

The input device 730 may be configured to receive inputted digital or character information, and generate a key signal input related to user setting and function control of the electronic device, such as a keyboard, a mouse. The output device 740 may include a display device such as a screen.

Embodiments of the disclosure further provide a storage medium including computer executable instructions. The computer executable instructions are configured to implement the data processing method for a shared memory according to embodiments of the disclosure when executed by a computer processor.

Certainly, the computer executable instructions of the storage medium according to embodiments of the disclosure are not limited to the above-mentioned method operations, and may also execute related operations in the data processing method for a shared memory according to any of embodiments of the disclosure.

Embodiments of the disclosure further provide a computer program product. The computer program product includes computer program codes. When the computer program codes are operated on a computer, the data processing method for a shared memory according to any of the above embodiments is performed.

Embodiments of the disclosure further provide a computer program. The computer program includes computer program codes. A computer is caused to execute the data processing method for a shared memory according to any of the above embodiments when the computer program codes are operated on the computer.

From the above description of embodiments, it may be clearly understood by the skilled in the art that the disclosure may be implemented by software and necessary general hardware, and may also be realized by hardware, but the former is a better embodiment in multiple cases. Based on this understanding, the technical solution of the disclosure may be embodied in the form of software products in essence or in the part that contributes to related technologies. The computer software product may be stored in a computer-readable storage medium, such as a floppy disk of the computer, a read only memory (ROM), a random-access memory (RAM), a flash, hard disk or optical disk, etc., and includes several instructions to enable a computer device (which may be a personal computer, a server, or a network device, etc.) to execute the method according to each embodiment of the disclosure.

It is worth noting that, each unit and module included in embodiments of the above data processing apparatus is only divided based on a functional logic, but it is not limited to the above division, as long as a corresponding function may be realized. In addition, a detailed name of each functional unit is merely for the convenience of distinguishing each other, and is not used to limit a protection scope of the disclosure.

It should be noted that, relational terms such as "first" and "second" in the description are merely used to distinguish one entity or operation from another entity or operation, and do not necessarily require or imply that there is any such actual relationship or order between these entities or operations. However, terms "including", "comprising" or any other variant thereof are intended to cover a non-exclusive inclusion, such that procedures, methods, products or devices including a series of elements not only include those elements, but also include other elements not explicitly listed, or further includes elements inherent in such procedures, methods, products, or devices. Without more limitations, an element limited by a sentence "includes one . . . " does not exclude that there are additional identical elements in the procedures, methods, products, or devices that includes the element.

The above is merely detailed implementations of the disclosure, such that the skilled in the art may understand or implement the disclosure. Multiple modifications to these embodiments may be obvious to those skilled in the art, and the general principles defined herein may be implemented in other embodiments without departing from the scope of the disclosure. Therefore, the disclosure may not be limited to the embodiments described herein, but may conform to a broadest scope consistent with the principles and novel features disclosed herein.

All the embodiments of the disclosure may be executed separately or in combination with other embodiments, which is within the protection scope of the disclosure.

The invention claimed is:

1. A data processing method for a shared memory, comprising:
   receiving a writing operation request of target data, the writing operation request being configured to request to write the target data to the shared memory;
   obtaining a writing index value in the shared memory, and updating the writing index value, an updated writing index value being 1 greater than the writing index value obtained before the updating, and the writing index value being configured to lock a storage block to which data is to be written;
   determining a storage block corresponding to the updated writing index value as a target storage block;
   writing the target data to the target storage block;
   receiving a reading operation request of a target user equipment, the reading operation request being configured to request to read data of a first storage block in the shared memory;
   obtaining a reading index value corresponding to the target user equipment, wherein the reading index value is configured to indicate a storage block in the shared memory where the target user equipment completes data reading;
   determining that a storage index value in the shared memory is greater than the reading index value, the storage index value being configured to indicate a storage block where data writing is completed in the shared memory;
   detecting that a state corresponding to the first storage block is a first state, and reading the data in the first storage block, wherein the first state is configured to indicate that data writing at the first storage block is completed; and
   sending a data reading message to the target user equipment based on the state corresponding to the first storage block detected again after data reading at the first storage block is completed, the data reading message being configured to indicate a reading result of the first storage block.

2. The method of claim 1, wherein sending the data reading message to the target user equipment based on the state corresponding to the first storage block comprises one of:
   detecting that the state corresponding to the first storage block is the first state, and sending a first data reading message to the target user equipment, the first data reading message comprising the data in the first storage block; or
   detecting that the state corresponding to the first storage block is a second state, and sending a second data reading message to the target user equipment, the second data reading message being configured to indicate a failure of the data reading at the first storage block,
   wherein the second state is configured to indicate that data is being written to the first storage block.

3. The method of claim 2, before writing the target data to the target storage block, the method further comprising:
   setting a state corresponding to the target storage block to a second state;
   after writing the target data to the target storage block, the method further comprising:
   setting the state corresponding to the target storage block to the first state.

4. The method of claim 3, after setting the state corresponding to the target storage block to the first state, the method further comprising:
   updating the storage index value in the shared memory, an updated storage index value being 1 greater than the storage index value obtained before the updating.

5. The method of claim 1, after sending the first data reading message to the target user equipment, the method further comprising:
   sending an update message of the reading index value to the target user equipment, the update message being configured to indicate the target user equipment to update the reading index value, and an updated reading index value being 1 greater than the reading index value obtained before the updating.

6. The method of claim 1, further comprising:
   sending a third data reading message to a target user equipment, the third data reading message being configured to indicate the target user equipment to read data from the shared memory.

7. The method of claim 1, wherein writing the target data to the target storage block comprises:
   determining that the target storage block is a first storage block in the shared memory and that data is stored in the first storage block; and
   storing the target data to the first storage block by replacing the data stored in the first storage block with the target data.

8. An electronic device, comprising:
   one or more processors; and
   a storage device, configured to store one or more programs,
   wherein when the one or more programs are executed by the one or more processors, the one or more processors are configured to:
   receive a writing operation request of target data, the writing operation request being configured to request to write the target data to the shared memory;
   obtain a writing index value in the shared memory, and update the writing index value, an updated writing index value being 1 greater than the writing index value obtained before the updating, and the writing index value being configured to lock a storage block to which data is to be written;
   determine a storage block corresponding to the updated writing index value as a target storage block;
   write the target data to the target storage block;
   receive a reading operation request of a target user equipment, the reading operation request being configured to request to read data of a first storage block in the shared memory;
   obtain a reading index value corresponding to the target user equipment, wherein the reading index value is configured to indicate a storage block in the shared memory where the target user equipment completes data reading;
   determine that a storage index value in the shared memory is greater than the reading index value, the storage index value being configured to indicate a storage block where data writing is completed in the shared memory;
   detect that a state corresponding to the first storage block is a first state, and reading the data in the first storage block, wherein the first state is configured to indicate that data writing at the first storage block is completed; and send a data reading message to the target user equipment based on the state corresponding to the first storage block detected again after data reading at the first storage block is completed, the data reading message being configured to indicate a reading result of the first storage block.

9. The electronic device of claim 8, wherein when sending the data reading message to the target user equipment based on the state corresponding to the first storage block, the one or more processors are further configured to one of:
   detect that the state corresponding to the first storage block is the first state, and send a first data reading message to the target user equipment, the first data reading message comprising the data in the first storage block; or
   detect that the state corresponding to the first storage block is a second state, and send a second data reading message to the target user equipment, the second data reading message being configured to indicate a failure of the data reading at the first storage block,
   wherein the second state is configured to indicate that data is being written to the first storage block.

10. The electronic device of claim 9, wherein before writing the target data to the target storage block, the one or more processors are further configured to:
   set a state corresponding to the target storage block to the a second state;
   after writing the target data to the target storage block, the one or more processors are further configured to comprising:
   set the state corresponding to the target storage block to the first state.

11. The electronic device of claim 10, after setting the state corresponding to the target storage block to the first state, the one or more processors are further configured to:
   update the storage index value in the shared memory, an updated storage index value being 1 greater than the storage index value obtained before the updating.

12. The electronic device of claim 8, after sending the first data reading message to the target user equipment, the one or more processors are further configured to:
   send an update message of the reading index value to the target user equipment, the update message being configured to indicate the target user equipment to update the reading index value, and an updated reading index value being 1 greater than the reading index value obtained before the updating.

13. The electronic device of claim 8, wherein the one or more processors are further configured to:
   send a third data reading message to a target user equipment, the third data reading message being configured to indicate the target user equipment to read data from the shared memory.

14. The electronic device of claim 8, wherein when writing the target data to the target storage block, the one or more processors are further configured to:
   determine that the target storage block is a first storage block in the shared memory and that data is stored in the first storage block; and
   store the target data to the first storage block by replacing the data stored in the first storage block with the target data.

15. A non-transitory computer readable storage medium having a computer program stored thereon, wherein, when the computer program is executed by a processor, a data processing method for a shared memory is performed, the method comprising:
   receiving a writing operation request of target data, the writing operation request being configured to request to write the target data to the shared memory;
   obtaining a writing index value in the shared memory, and updating the writing index value, an updated writing index value being 1 greater than the writing index value obtained before the updating, and the writing index value being configured to lock a storage block to which data is to be written;
   determining a storage block corresponding to the updated writing index value as a target storage block;
   writing the target data to the target storage block;
   receiving a reading operation request of a target user equipment, the reading operation request being configured to request to read data of a first storage block in the shared memory;
   obtaining a reading index value corresponding to the target user equipment, wherein the reading index value is configured to indicate a storage block in the shared memory where the target user equipment completes data reading;
   determining that a storage index value in the shared memory is greater than the reading index value, the storage index value being configured to indicate a storage block where data writing is completed in the shared memory;
   detecting that a state corresponding to the first storage block is a first state, and reading the data in the first storage block, wherein the first state is configured to indicate that data writing at the first storage block is completed; and
   sending a data reading message to the target user equipment based on the state corresponding to the first storage block detected again after data reading at the first storage block is completed, the data reading message being configured to indicate a reading result of the first storage block.

* * * * *